United States Patent [19]
Bosch et al.

[11] 3,956,570
[45] May 11, 1976

[54] METHOD FOR IMPARTING WATER-REPELLENCY TO CONSTRUCTION MATERIALS

[75] Inventors: Erhard Bosch, Burghausen; Karl Braunsperger, Raitenhaslach; Herbert Gluck, Burghausen; Ewald Pirson, Burghausen; Michael Roth, Burghausen, all of Germany

[73] Assignee: Wacker-Chemie GmbH, Munich, Germany

[22] Filed: Sept. 19, 1973

[21] Appl. No.: 398,884

[30] Foreign Application Priority Data
Sept. 19, 1972 Germany............................ 2245927

[52] U.S. Cl................................. 428/446; 428/454
[51] Int. Cl.²........................................... C08J 3/12
[58] Field of Search..................... 117/135.5, 123 C; 106/2; 427/135, 137, 430, 421

[56] References Cited
UNITED STATES PATENTS

| | | | |
|---|---|---|---|
| 2,344,579 | 3/1944 | Whitesides................... | 117/123 C X |
| 2,356,542 | 8/1944 | Sloan .............................. | 117/123 C |
| 2,507,200 | 5/1950 | Elliott........................... | 117/135.5 X |
| 2,928,752 | 3/1960 | Felletschin................... | 117/123 C X |
| 3,310,417 | 3/1967 | Lerner et al................. | 117/135.5 X |
| 3,502,500 | 3/1970 | Hoock............................. | 117/123 C |
| 3,589,917 | 6/1971 | Hedlund....................... | 117/123 C X |
| 3,772,065 | 11/1973 | Seiler............................. | 106/2 X |

*Primary Examiner*—Cameron K. Weiffenbach
*Assistant Examiner*—R. Eugene Varndell, Jr.

[57] ABSTRACT

A method for imparting water repellency to construction materials which comprises treating said materials with a solution containing alkali metal organosiliconates of which at least 10 percent of the alkali metal organosiliconates are alkali metal propylsiliconates.

4 Claims, No Drawings

METHOD FOR IMPARTING WATER-REPELLENCY TO CONSTRUCTION MATERIALS

The present invention relates to the treatment of materials to impart water repellency thereto. More particularly it relates to a method for rendering materials containing inorganic substances water repellent by treating the materials with a composition containing water-soluble siliconates.

Although various techniques have been used to render construction materials water repellent, a distinction must be made between the addition of hydrophobic agents to the construction materials before they are formed or molded and coating the construction materials after they have been molded and partially cured. The present invention relates to a method for rendering a molded and partially cured material water repellent by the latter technique.

Heretofore, construction materials composed of inorganic substances have been rendered water repellent by treating the surfaces thereof with aqueous solutions of alkali metal organosiliconates such as described in U.S. Pat. No. 2,507,200 to Elliot et al. It has however, been found that the so-called hydrophobic agents, such as alkali metal methylsiliconates, do not provide satisfactory results when the surfaces of the construction materials contain free lime and have a pH value of at least 8. Even though it has been known that free lime can at least be partially bound by pretreating the surfaces with salts, such as a solution of ammonium bicarbonate prior to the application of the alkali metal organosiliconates, this procedure involves additional treating steps and thus increased costs (DT-AS 1,003,116).

Heretofore, no differences in the effectiveness of the various hydrocarbon radicals in the alkali metal organosiliconates in regard to imparting water repellency to construction materials were known. This no doubt is the reason that alkali metal methylsiliconates have been used exclusively as the alkali organosiliconates for imparting water repellency to construction materials composed of inorganic substances.

Surprisingly, we have found that alkali metal propylsiliconates impart substantially better water repellent properties to construction materials having a pH value of at least 8 than alkali metal methyl-, ethyl- or vinylsiliconates. This discovery has solved the problem of imparting rapid and improved water repellent properties to materials having a pH value of at least 8, such as is found on the surfaces of construction materials containing free lime, i.e., partially cured surfaces of construction materials of inorganic substances containing calcium compounds.

Therefore, it is an object of this invention to render materials containing inorganic substances water repellent. Another object of this invention is to provide a method for treating construction materials to impart water repellency thereto. Another object of this invention is to provide a method for imparting water repellency to surfaces of materials containing free lime and having a pH value of at least 8. Still another object of this invention is to provide a method for imparting water repellency to materials having free lime, without having to pretreat the surface prior to the application of the alkali metal organosiliconate. A further object of this invention is to provide water repellency to materials composed of inorganic substances and having a pH value of at least 8 in a single step.

The foregoing objects and others which will be apparent from the following description are accomplished in accordance with this invention, generally speaking, by treating materials composed of inorganic substances and having a pH value of at least 8 with a solution containing alkali metal propylsiliconates.

Materials which may be treated by the compositions of this invention are molded, partially cured construction materials composed of inorganic substances containing calcium compounds which have been produced with the use of lime or Portland Cement as binding agents. Such construction materials may be at their site of use, such as would be applicable to lime coatings, plaster and similar wall coatings which have a base made of sand and hydraulic binding agents such as lime or Portland Cement, stuccoes made of Portland Cement and concrete or limestone brick wall fronts. Such materials may however also consist of molded materials which are treated with the invented process prior to their final employment, as would be applicable to limestone bricks before the walls are built or to concrete pipe before they are laid.

The term "at least partially cured" as employed herein is intended to indicate that the construction materials have cured at least to the extent that they are able to maintain their shape without the support of such aids as covers or molds. Complete curing or drying of the construction materials prior to the application of the water repellent is however, excluded by the requirement that the surfaces of which water repellency is to be induced must have a pH value of at least 8.

The alkali metal contained in alkali metal organosiliconates used in this invention may be lithium, sodium, potassium, rubidium, or cesium. Sodium and potassium are preferred due to their availability; however, because of its lower tendency towards efflorescence, potassium is especially preferred.

The alkali metal propylsiliconates, especially monomer compounds may be represented by the general formula:

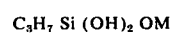

$C_3H_7 Si(OH)_2 OM$ and the polymer compounds are composed of units of the general formula

$C_3H_7SiO(OM)$ in which M represents the alkali metals.

The propyl radical can be the n-propyl- and/or iso-propyl radical; however, because of its availability, the n-propyl radical is preferred.

Other alkali metal organosiliconates, especially monomeric compounds, which may be employed in combination with the alkali metal propylsiliconates may be represented by the formula

$R Si(OH)_2OM$ and the polymeric compounds are composed of units of the general formula

$R SiO(OM)$ where M is the same as above.

In these formulae R represents a monovalent organic Si—C— bonded radical, preferably a monovalent aliphatic hydrocarbon radical having 1, 2 or 4 carbon atoms and/or an aromatic hydrocarbon radical, such as a phenyl radical. Especially preferred among these other alkali metal organosiliconates are alkali metal methylsiliconates. Further examples of monovalent aliphatic hydrocarbon radicals represented by R are alkyl radicals, such as ethyl-, n-butyl- and sec -butyl radicals as well as alkenyl radicals such as vinyl- and allyl radicals. Alkali metal organosiliconates are sometimes obtained from the distillation residue of the reaction product of hydrocarbon halides, especially methyl chloride, with silicon. This distillation residue contains silcarbanes. Thus a portion of the R radicals, or the silicon oxygen atoms can be replaced by bivalent organic radicals, especially alkylene radicals such as methylene, ethylene, or propylene radicals which are bonded to an additional Si-atom. The alkali metal propylsiliconates should be present in an amount of at least 10 percent by weight and more preferably up to about so percent by weight based on the total weight of the alkali metal organosiliconates.

The alkali metal organosiliconates may be prepared from siliconic acids, monoorganosilane triols, or their condensation products and are described, for example, by Meads and Kipping, Journal of Chemical Society, 105,679. The propyl siliconates may be prepared, for example, by hydrolyzing propyl trichlorosilane or mixtures of propyltrichlorosilane and other hydrocarbon trichlorosilanes and dissolving these products in a strong inorganic base, i.e., an aqueous solution of an alkali metal in such proportions that there is at least one equivalent of base per silicon atom. The resultant solution containing the soluble siliconate is diluted to the desired concentration.

The aqueous solutions of the alkali metal organosiliconates may be replaced by up to 50 percent by weight of the water by water-miscible inert organic solvents, such as for example alcohols, such as methanol, ethanol, n-propanol, isopropanol, and/or ethylene glycol, and/or ketones, such as acetone and/or methylethylketone. While these solvents may contribute to the stability of the solution, they are however generally not required.

The solutions employed according to the invention contain no or almost no undissolved substances such as pigments, since they would otherwise be dispersions rather than solutions. Although it is preferred that the solutions of this invention contain only alkali metal propylsiliconates, other alkali metal alkylsiliconates having from 1, 2 or 4 carbon atoms in the alkyl group may be included in the composition.

The alkali metal organosiliconate content of the aqueous solution, based on $RSiO_{3/2}$, where R represents a hydrocarbon radical is preferably 0.02 to 10.0 percent by weight and more preferably from 0.5 to 5.0 percent by weight based on the total weight of the aqueous solution.

The solutions which are the subject of this invention may be applied by any means known in the art for coating surfaces to impart water repellency thereto, such as by painting, spraying or immersion.

If additional coatings are to be applied to the surfaces which have been rendered water-repellent with the compositions of this invention, such additional coatings should preferably be dispersions of dyes or plasters which have a pH value of at least 8 when wet. Generally better results are obtained when the subsequent coatings applied over the compositions of this invention have a pH value of at least 8.

The process of this invention results in such a high degree of water repellency that the construction materials thus treated exhibit improved abrasion resistance. Moreover, the coated construction materials are made weather-resistant even when the carbon dioxide in the air does not have access to such surfaces prior to the application of the alkali metal organosiliconates, such as would occur in the case of stacked limestone bricks. These improvements are attained without any extensive and costly preliminary treatment of the surfaces to be made water repellent and without additional drying steps other than the one required for drying the alkali metal organosiliconate coating of this invention. Furthermore, the conversion of free lime into a bound form prior to the application of the repellent composition of this invention is not required.

Various embodiments of this invention are further illustrated by the following examples in which all parts are by weight unless otherwise specified. The percentages indicated in these examples are based on weight unless otherwise indicated.

EXAMPLE 1

The following aqueous alkali metal alkylsiliconate solutions are applied by immersing concrete discs having a diameter of 8 cm and a thickness of 2 cm in the solutions for 60 seconds. The concrete's composition conforms to that described in DIN 1164. Test samples (a) are immersed in the solutions 5 hours after their manufacture. Test samples (b) are coated the same way 24 hours after their manufacture and test samples (c) are coated with the solutions six weeks after manufacture.

| Alkali metal alkylsiliconate solutions | Siliconate Concentration, (Calculated as $RSiO_{3/2}$) Percent |
|---|---|
| (A) Potassium n-propylsiliconate | 5.0 |
| (B) Potassium n-propylsiliconate | 3.3 |
| (C) Potassium methylsiliconate Potassium-n-propylsiliconate Weight ratio of $CH_3SiO$: $C_3H_7SiO_{3/2} = 1 : 3$ | 5.0 |
| $V_1$ Potassium methylsiliconate | 5.0 |
| $V_2$ Potassium ethylsiliconate | 5.0 |
| $V_1$ and $V_2$ are comparison examples. | |

Following immersion, the samples are exposed for 8 days to ambient air at room temperature for drying, weighed, and then immersed in water for 1, 2, 4 and 6 hours respectively in order to determine the various water-absorption values by means of the increase in weight (First Immersion). After this first immersion in water the same samples are dried once more by exposing them to ambient air at room temperature.

They are then again immersed in water for 1, 2, 4 and 6 hours respectively and the various water-absorption values are again determined by ascertaining the increase in weight (Second Immersion). The results are indicated in Table I:

TABLE 1

| ALKALI METAL ALKYL-SILICONATE SOLUTION | | Percent Water Absorption | | | | | | |
|---|---|---|---|---|---|---|---|---|
| | | First Immersion | | | | Second Immersion | | |
| | | 1 hr. | 2 hr. | 3 hr. | 4 hr. | 1 hr. | 2 hr. | 3 hr. | 4 hr. |
| (A) | a | 1.1 | 1.7 | 2.1 | 2.4 | 0.4 | 0.7 | 1.1 | 1.5 |
| | b | 0.5 | 0.7 | 1.1 | 1.6 | 0.6 | 0.9 | 1.7 | 2.1 |
| | c | 0.4 | 0.5 | 0.7 | 0.8 | 0.4 | 0.5 | 0.9 | 1.4 |
| (B) | a | 0.6 | 1.2 | 1.8 | 2.3 | 1.0 | 1.4 | 2.4 | 3.0 |
| | b | 0.6 | 1.1 | 1.8 | 2.5 | 0.9 | 1.4 | 2.7 | 3.4 |
| | c | 0.4 | 0.5 | 0.7 | 0.9 | 0.4 | 0.4 | 0.5 | 1.1 |
| (C) | a | 1.5 | 0.9 | 1.6 | 2.1 | 0.6 | 0.7 | 1.9 | 2.1 |
| | b | 0.5 | 0.7 | 1.1 | 1.6 | 0.5 | 0.8 | 1.4 | 1.9 |
| | c | 1.4 | 1.5 | 1.7 | 1.0 | 0.3 | 0.4 | 0.6 | 1.0 |
| $V_1$ | a | 1.1 | 3.4 | 4.2 | 5.9 | 4.7 | 5.8 | 6.1 | 6.2 |
| | b | 1.1 | 3.0 | — | — | — | — | — | — |
| | c | 0.8 | 1.4 | 2.2 | 2.5 | 4.5 | 5.8 | 6.0 | 6.1 |
| $V_2$ | a | 2.3 | 3.7 | 6.1 | 6.4 | 6.1 | 6.2 | 6.3 | 6.5 |
| | b | 2.9 | 4.3 | 5.6 | 6.1 | 5.5 | 5.5 | 5.6 | 6.2 |
| | c | 0.4 | 0.7 | 1.4 | 2.1 | 4.5 | 5.1 | 5.5 | 5.6 |
| UNTREATED | | 5.5 | 5.5 | 5.8 | 6.7 | 4.5 | 4.9 | 5.7 | 6.0 |

These results show that the water-repellent action of alkali metal methyl and alkali metal ethylsiliconate is relatively low when they are applied to freshly prepared concrete discs (samples a and b), and the water repellency is further reduced when applied to concrete discs 6 weeks old (sample c). When the immersion is repeated (Second Immersion) water repellency is lost. On the other hand, the results demonstrate that the water-repellent effect of alkali metal n-propylsiliconates and mixtures of alkali metal propylsiliconates and another alkali metal alkylsiliconates is practically impervious to basic environmental conditions and is not substantially reduced when the coated concrete is subjected to repeated exposure to water.

EXAMPLE 2

Concrete discs identical to the ones described in Example 1 are coated 24 hours after their production by immersion for 60 seconds in an aqueous solution which contains 4 percent potassiumn-propylsiliconates calculated as $C_3H_7SiO_{3/2}$. For comparison purposes similar discs are immersed in an aqueous solution which contains 4 percent potassium methylsiliconate, calculated as $CH_3SiO_{3/2}$. After immersion the test samples are immediately wrapped in polyethylene foil in order to exclude the carbon dioxide in the air and then stored for 1 week. After 1 week the samples are removed from the polyethylene packaging and exposed for 1 week to ambient air and room temperature. Finally the water absorption is determined on the samples in accordance with the procedure described in Example 1.

TABLE II

| | Percent Water Absorption | | | | | | | |
|---|---|---|---|---|---|---|---|---|
| | 1 hr. | 2 hr. | 4 hr. | 6 hr. | 1 hr. | 2 hr. | 4 hr. | 6 hr. |
| Potassium propyl-siliconate | 0.3 | 0.4 | 0.6 | 0.9 | 0.5 | 0.7 | 0.9 | 1.1 |
| Potassium methyl-siliconate | 2.5 | 3.0 | 3.5 | 3.8 | 3.5 | 3.8 | 4.0 | 4.1 |
| Untreated | 2.5 | 3.0 | 3.5 | 3.7 | 3.5 | 3.7 | 4.0 | 4.1 |

The above results show that when the test samples are not exposed to the carbon dioxide in the atmosphere shortly after the application of the alkali metal alkysiliconate solutions, the alkali metal propylsiliconate imparts water repellency, whereas the alkali metal methylsiliconate does not impart water repellency.

EXAMPLE 3

Gas concrete samples measuring 20 cm × 10 cm × 10 cm are removed from a curing autoclave and one of the 10 cm × 20 cm surfaces is immediately immersed for 30 seconds in an aqueous solution containing 2 percent potassium n-propylsiliconate, calculated as $C_3H_7SiO_{3/2}$. For comparison purposes another gas concrete specimen is immersed in an aqueous solution of 2 percent potassium methylsiliconate, calculated as $CH_3SiO_{3/2}$. Again for comparison purposes, other surfaces are subsequently immersed for 30 seconds in distilled water. The surfaces which are treated with the alkali metal alkylsiliconates are then placed against each other and the contact interstices are sealed with putty. All test specimens are stored for 5 days in a dry room. The surfaces which had been in contact are separated and the samples are weighed and then the surfaces which had been treated with the alkali metal alkylsiliconates are then placed on plastic foam which is saturated with water. The degree of water absorption is then determined according to the time periods indicated in Table III. The results are similar to those illustrated in Example 2.

TABLE III

| | Water Absorption kg $H_2O$/m | | |
|---|---|---|---|
| | 3 hr. | 8 hr. | 24 hr. |
| Potassium n-propylsiliconate | 0.35 | 0.85 | 2.95 |
| Potassium methylsiliconate | 4.31 | 6.56 | 10.99 |
| Water | 5.34 | 7.32 | 11.51 |

While specific embodiments of the invention have been described, it should not be limited to the particular alkali metal organosiliconates described herein. It is intended to include all modifications and variations within the spirit and scope of this invention.

What is claimed is:

1. An improved process for rendering surfaces of inorganic construction materials having a pH value of at least 8 water repellent by treating said surfaces with an aqueous solution of alkali metal organosiliconates, the improvement which comprises applying to said surfaces which have cured at least to the extent that they are able to maintain their shape in the absence of a support, a solution containing a mixture of alkali metal organosiliconates in which at least 10 percent by weight based on the weight of the mixture of alkali metal organosiliconates are alkali metal propylsiliconates.

2. The process of claim 1 wherein said mixture contains at least 10 percent by weight based on the weight of the alkali metal organosiliconates of alkali metal propylsiliconates and the remainder of the mixture is alkali metal alkyl siliconates, in which the alkyl radical contains 1, 2 or 4 carbon atoms.

3. The process of claim 2 wherein the alkali metal alkylsiliconates are selected from the class consisting of monomeric compounds of the formula $$R\ Si(OH)_2OM$$

and polymeric compounds having units of the formula $$R\ SiO\ (OM)$$

in which R is an alkyl radical having 1, 2 or 4 carbon atoms and M is an alkali metal.

4. The process of claim 3 wherein the alkali metal alkylsiliconate is an alkali metal methylsiliconate.

* * * * *